United States Patent
Kuroda

(10) Patent No.: US 7,433,721 B2
(45) Date of Patent: Oct. 7, 2008

(54) MOBILE COMMUNICATIONS EQUIPMENT

(75) Inventor: Mitsuru Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 10/653,945

(22) Filed: Sep. 4, 2003

(65) Prior Publication Data

US 2004/0048632 A1 Mar. 11, 2004

(30) Foreign Application Priority Data

Sep. 5, 2002 (JP) ............................. 2002-260167

(51) Int. Cl.
*H04M 1/00* (2006.01)
(52) U.S. Cl. .............. 455/575.3; 455/550.1; 455/556.1; 379/433.07; 379/433.13
(58) Field of Classification Search .............. 455/550.1, 455/575.1, 556.1, 575.3, 575.4, 433.07; 379/433.07, 379/433.13
See application file for complete search history.

(56) References Cited

U.S. PATENT DOCUMENTS

| | | | | |
|---|---|---|---|---|
| 5,267,127 | A * | 11/1993 | Pollitt | 361/380 |
| 5,485,517 | A * | 1/1996 | Gray | 379/433.13 |
| 5,841,635 | A * | 11/1998 | Sadler et al. | 361/749 |
| 6,195,839 | B1 * | 3/2001 | Patterson et al. | 16/334 |
| 6,459,887 | B2 * | 10/2002 | Okuda | 455/90.1 |
| 6,580,932 | B1 * | 6/2003 | Finke-Anlauff | 455/566 |
| 2001/0036265 | A1 * | 11/2001 | Oh | 379/433.01 |
| 2002/0142810 | A1 * | 10/2002 | Kawasaki et al. | 455/566 |
| 2003/0040330 | A1 * | 2/2003 | Kim et al. | 455/550 |
| 2004/0040330 | A1 * | 3/2004 | Kosaka | 62/285 |
| 2004/0203513 | A1 * | 10/2004 | Kwon | 455/90.3 |
| 2004/0248628 | A1 * | 12/2004 | Taninai | 455/575.3 |

FOREIGN PATENT DOCUMENTS

| | | |
|---|---|---|
| CN | 1354587 A | 6/2002 |
| EP | 1 207 671 A2 | 5/2002 |
| JP | 2001-339497 | 12/2001 |
| JP | 2002-55760 | 2/2002 |
| JP | 2002-57771 | 2/2002 |
| JP | 2002-158758 | 5/2002 |
| WO | WO 01/84728 A1 | 11/2001 |

OTHER PUBLICATIONS

Chinese Search Report, dated Dec. 10, 2004.
European Search Report dated May 19, 2004.
Japanese Office Action dated May 16, 2006, and partial English translation.

* cited by examiner

*Primary Examiner*—George Eng
*Assistant Examiner*—Muthuswamy G Manoharan
(74) *Attorney, Agent, or Firm*—McGinn IP Law Group, PLLC

(57) ABSTRACT

A mobile communications equipment realizes data input with both hands, and an operation style of a small personal computer although it is a mobile phone in size. A first device unit includes a main unit loaded with a display unit for displaying various information. Each of a second device unit and a third device unit has input buttons for various operations. The first device unit has a connection unit for rotatably connecting the second device unit and the third device unit to the first device unit. The second device unit and the third device unit are connected to the first device unit at one point such that they can be expanded on both sides of the first device unit by depressing the button of an operation unit of the connection unit.

11 Claims, 5 Drawing Sheets

MOBILE COMMUNICATIONS EQUIPMENT

BACKGROUND OF THE INVENTION

1. Field of the Invention

The present invention relates to a mobile communications equipment such as a mobile phone, and more specifically to a mobile phone having a display unit and an operation unit.

2. Description of the Related Art

A mobile communications equipment is represented by mobile phones which have been widespread at an amazingly high speed. Various devices have been expanded to downsize a mobile phone and enhance its operability. FIG. 9 is an oblique view of a conventional folding mobile phone. The conventional mobile phone shown in FIG. 9 includes an upper housing portion 18 and a lower housing portion 19, and the upper housing portion 18 contains a display unit 29, a speaker 23, and a camera 28. On the other hand, the lower housing portion 19 contains operation buttons 21 for various operations and a microphone 22 for input of user's voice. The two housing portions 18 and 19 are connected such that they can be rotated by a hinge unit 20. When the mobile phone generates text mail, the user necessarily holds the lower housing portion 19 with one hand, and operates the mobile phone with the thumb of the hand.

FIG. 10 shows and example of a conventional mobile information terminal. In the conventional mobile information terminal shown in FIG. 10, a main unit 33 having operation keys 32 on the surface 31 of the unit 33 is connected to a display unit 35 having a display 34 for displaying information such that they can be rotated about a rotation axis through a connection unit 36. The connection unit 36 is arranged between two separate operation key areas 37 and 38 with the rotation axis line set orthogonal to the surface 31. Thus, the number of operation keys can be increased as necessary with the portability maintained, and the operability can be enhanced (for example, refer to Japanese Patent Laid-Open No. 2002-57771).

FIG. 11 shows another example of a conventional mobile information terminal. The conventional mobile information terminal shown if FIG. 11 includes a display unit housing portion 42 having a display unit 41, and an operation unit housing portion 44 having an operation unit 43. The end portion of the display unit housing portion 42 is connected to the end portion of the operation unit housing portion 44 through a connection member 45 with the surface of the display unit 41 of the display unit housing portion 42 facing the same direction as the surface of the operation unit 43 of the operation unit housing portion 44, and the display unit housing portion 42 and the operation unit housing portion 44 can be rotated about the rotation axis of the connection member 45 (for example, refer to Japanese Patent Laid-Open No. 2002-158758).

However, the conventional mobile phone shown in FIG. 9 requires a considerably long time to generate long text using a thumb only, thereby failing in quickly performing a process. especially, in an urgent and complicated business use, the conventional mobile phone is furthermore inconvenient. In the conventional mobile information terminal shown in FIG. 10, the number of operation keys can be increased, but the operation surface cannot be folded while the terminal is not being used, thereby possibly causing the problem of failing in downsizing. Furthermore, in the conventional mobile information terminal shown in FIG. 11, the display unit and the operation unit can be rotated using the connection member, but there is the problem that the terminal is not suitable in operation with both hands.

SUMMARY OF THE INVENTION

An object of the present invention is to provide a mobile communications equipment in which it is possible to input data with both hands and realize the operation style of a small personal computer although it is a mobile phone is size.

A mobile communications equipment according to the present invention includes: a first device unit having a main unit loaded with a display device for displaying information; and second and third device units having various operation buttons. The first device unit includes a connection unit for connecting the second and third device units to the first device unit such that they can be rotated.

The second and third device units are connected to the first device unit at on point.

The second and third device units are rotated to be expanded on both sides of the first device unit.

The second and third device units are stored on be back of the first device unit by rotating the second and third device units in the direction opposite to the expanding direction.

The connection unit has mechanical means for activating the second and third device units in a predetermined direction and an operation button, and the second and third device units are automatically expanded or stored by depressing the operation button.

The connection unit makes a predetermined angle with the main unit.

Each of the second and third device units is formed such that a thickness of the unit be gradually thinned from one end of the unit to the other end, and the first device unit is held at a predetermined angle with respect to a horizontal surface by expanding the second and third device units.

The main unit includes a camera unit on its back, and the camera unit is concealed by storing the second device unit or the third device unit.

Each of the second and third device units is independently expanded and stored.

The second and third device units are automatically expanded and stored by a motor provided on the connection unit.

BRIEF DESCRIPION OF THE DRAWINGS

DETAILED DESCRIPTION OF THE PREFERRED EMBODIMENTS

The embodiments of the present invention are described below in detail by referring to the attached drawings.

Figure 1:
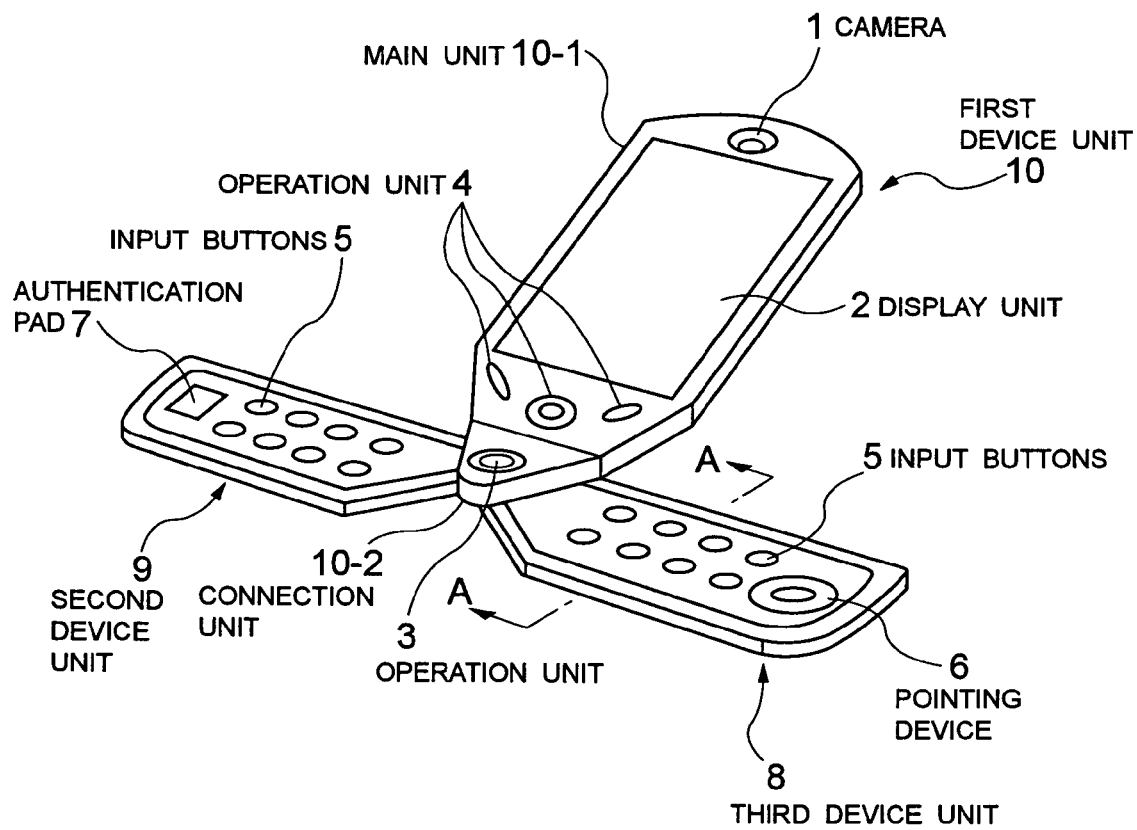
FIG. 1 is an oblique view of a mobile phone according to a first embodiment of the present invention.

FIG. 1 is an oblique view of a mobile phone according to a first embodiment of the present invention. As shown in FIG. 1, the mobile phone according to the first embodiment of the present invention is comprised of a nearly rectangular first device unit 10, a second device 9 and a third device unit 8.

The first device unit 10 has a main unit 10-1 and a nearly taper connection unit 10-2. The main unit 10-1 is provided with a display unit 2 to which a transparent resin molded plate or the like is applied to protect a display device unit such as an LCD for displaying various information against an external force. Above the display unit 2, a camera 1 for shooting a user is provided. Below the display unit 2, and operation unit 4 for operating the minimal function for communications is provided. The second device unit 9 and the third device unit 8 are rotatably connected by the connection unit 10-2. The connection unit 10-2 has an operation unit 3 for controlling rotation operations of the second device unit 9 and the third unit 8. FIG. 1 shows the mode (expanded mode) in which the second device unit 9 and the third device unit 8 are expanded on both sides of the first device unit 10.

Figure 2:
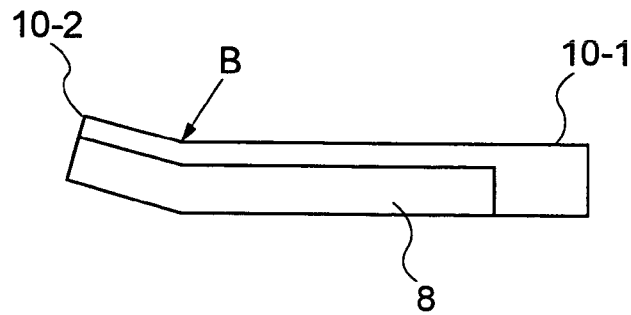
FIG. 2 is a side view of the mobile phone is a storage mode (closed mode)

FIG. 2 is a side view of the mobile phone shown in FIG. 1 in the mode (storage mode) in which the second device unit 9 and the third device unit 8 are stored on the back of the first device unit 10. As shown in FIG. 2, the connection unit 10-2 having the operation unit 3 is configured to make an arbitrary angle with the main unit 10-1 from the arrow portion B shown in FIG. 2. The second device unit 9 and the third device unit 8 are stored on the back of the main unit 10-1.

Figure 3:
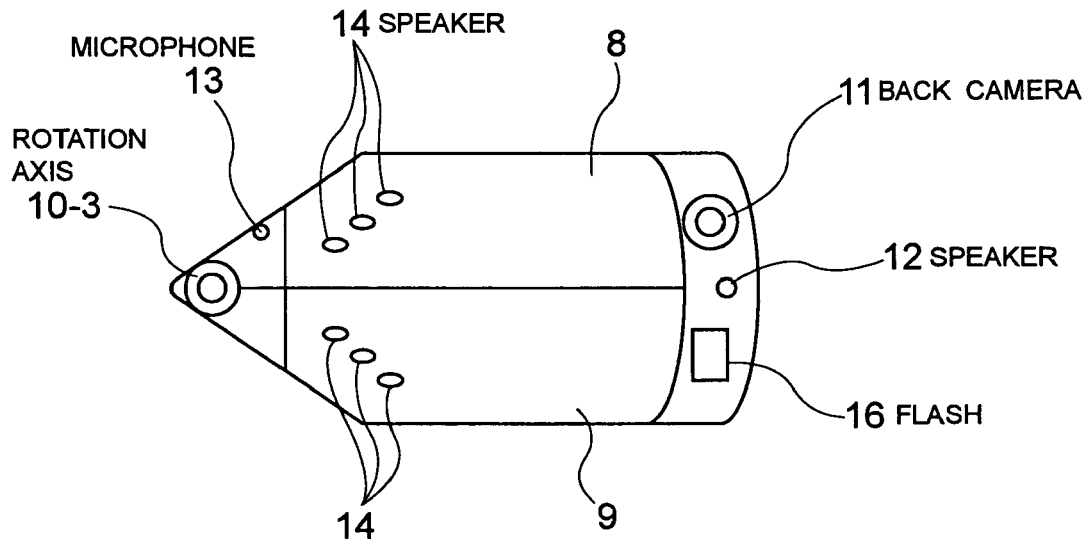
FIG. 3 is a back view of the mobile phone in the storage mode.

FIG. 3 is a back view of the mobile phone shown in FIG. 1 in the storage mode (closed mode). As shown in FIG. 3, a back camera 11 capable of displaying a captured image on the display unit 2, a speaker 12 for outputting the voice of a communications partner, and a flash 16 for supporting the shooting in the dark are provided for the main unit 10-1 as being exposed without being concealed by the second device unit 9 and third device unit 8 which are rotated. Speakers 14 for outputting a reception tone for informing the reception of a call and various music are provided in the back of the second device unit 9 and the third device unit 8. The third device unit 8 is provided with a microphone 13 for input of the voice of a user. The microphone 13 can be provided in the second device unit 9.

The second device unit 9 and the third device unit 8 are connected to the first device unit 10 by the connection unit 10-2, and can be rotated about a rotation axis 10-3. The user can either expand and store the second device unit 9 only or expand and store the third device unit 8 only. That is, each of the second device unit 9 and the third device unit 8 can be independently expanded and stored.

The second device unit 9 and the third device unit 8 may be activated constantly in a predetermined direction. For example, the second device unit 9 and the third device unit 8 are activated constantly in the expanding direction (direction in which the second device unit 9 and the third device unit 8 are expanded) by using a coil spring, a leaf spring or the like. In this case, in the storage mode, the second device unit 9 and the third device unit 8 can be controlled not to be expanded by a locking structure, and can be unlocked by depressing the button of the operation unit 3. With this structure, the second device unit 9 and the third device unit 8 can be simultaneously expanded by operating the operation unit 3.

A small servomotor or the like may be used in the connection unit 10-2. Using an electric drive by a small servomotor or the like, a expanding operation (operation of expanding the second device unit 9 and the third device unit 8 from the storage mode) and a storing operation (operation of storing the second device unit 9 and the third device unit 8 from the expanded mode to the back of the first device unit 10) can be automatically performed. The expansion angles of the second device unit 9 and the third device unit 8 can be freely designed.

Figure 4:
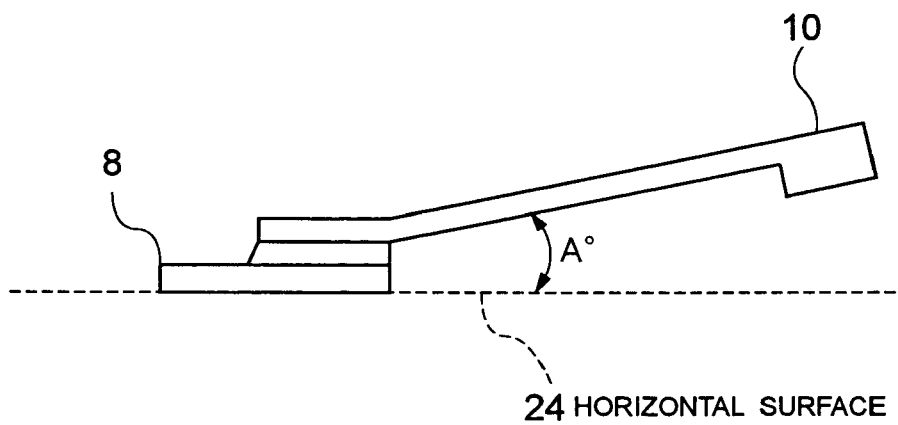
FIG. 4 is a side view of the mobile phone for use on the desk in an expanded mode.

FIG. 4 is a side view of the mobile phone shown in FIG. 1 in the expanded mode for use on the desk. The angle is set as indicated by the arrow B shown in FIG. 2, and the second device unit 9 and the third device unit 8 are connected at one point as shown in FIG. 1. With the configuration, the display surface of the first device unit 10 in the expanded mode is held with a tilt of A° about a horizontal surface 24 on the desk as shown in FIG. 4. Therefore, the visibility of the display unit 2 for a user can be enhanced when the user uses the mobile phone on the desk.

Figure 5:
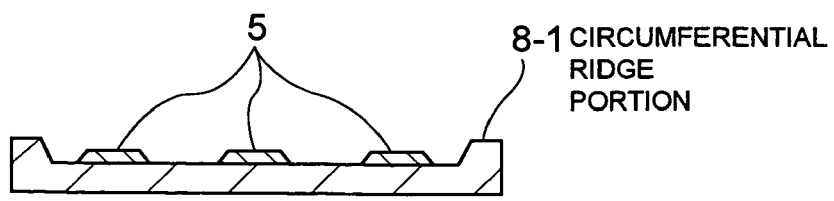
FIG. 5 is a sectional view taken in the direction of the arrows substantially along the line from A to A of FIG. 1.

The operation surfaces of the second device unit 9 and the third device unit 8 are described below by referring to FIG. 5. FIG. 5 is a sectional view taken in the direction of the arrows substantially along the line from A to A of FIG. 1. As shown in FIG. 1, the second device unit 9 has a number of input buttons (operation buttons) 5 and an authentication pad 7 for authentication of a fingerprint. The third device unit 8 has a number of input buttons 5 and a pointing device 6.

The input buttons 5 are set lower than a circumferential ridge portion 8-1 of the third device unit 8 as shown in FIG. 5 so that they cannot be pressed by the back of the first device unit 10 in the storage mode.

According to the first embodiment of the present invention, a sufficient operation button area can be reserved although the display unit 2 is expanded to the maximum size. Furthermore, in the expanded mode, the display unit 2 is held at a predetermined angle with respect to the horizontal surface 24, and the operation surfaces of the second device unit 9 and the third device unit 8 are expanded on both sides of the display unit 2. Therefore, the equipment can be used as a small personal computer.

Figure 6:
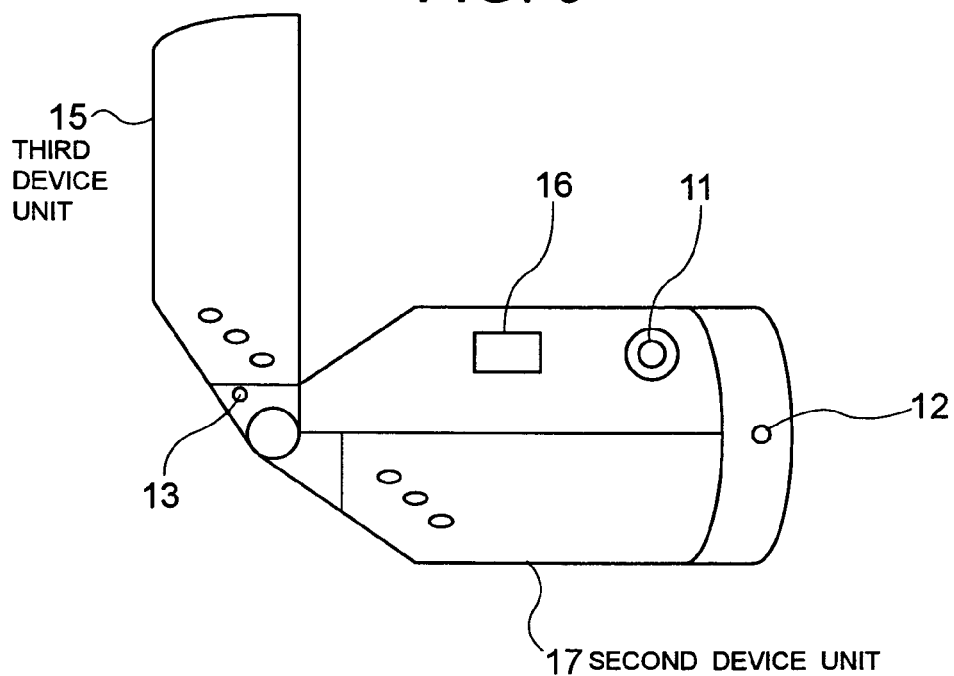
FIG. 6 is a back view of a mobile phone according to a second embodiment of the present invention.

A second embodiment of the present invention is described below. FIG. 6 is a back view of a mobile phone according to the second embodiment of the present invention. According to the second embodiment of the present invention, the back camera 11 and the flash 16 mounted on the back of the mobile phone are arranged on the back of the main unit to be concealed by a third device unit 15 in the storage mode. Otherwise, the configuration is basically the same as in the first embodiment of the present invention. Since the back camera 11 is concealed by the third device unit 15 when it is not in use, the back camera 11 can be protected against an external force, wear and tear, etc. when the user carries it. Additionally, since it is clear that the back camera 11 is concealed when it is not in use, the other party is not afraid of being shot secretly. The back camera 11 and the flash 16 can be arranged on the back of the main unit such that they can be concealed by a second device unit 17 in the storage mode.

Figure 7:
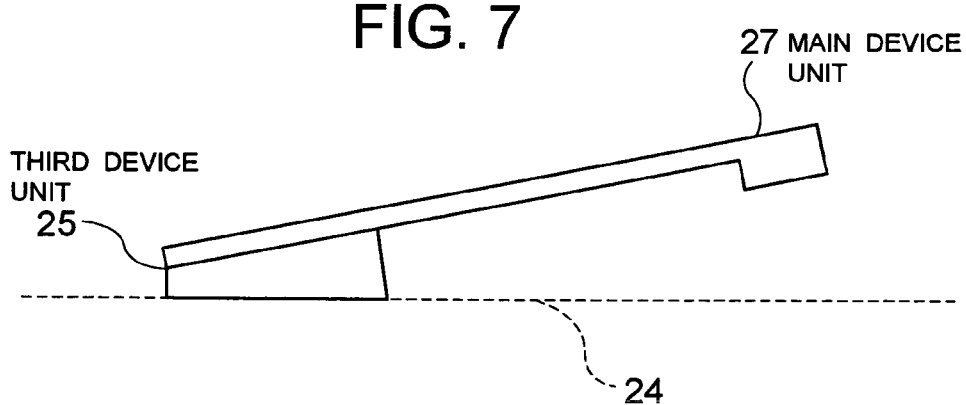
FIG. 7 is a side view of a mobile phone according to a third embodiment of the present invention.
Figure 8:
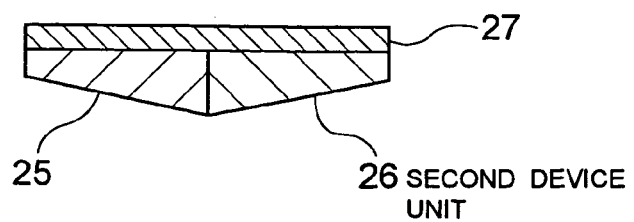
FIG. 8 is a sectional view of the mobile phone shown in FIG. 7.
Figure 9:
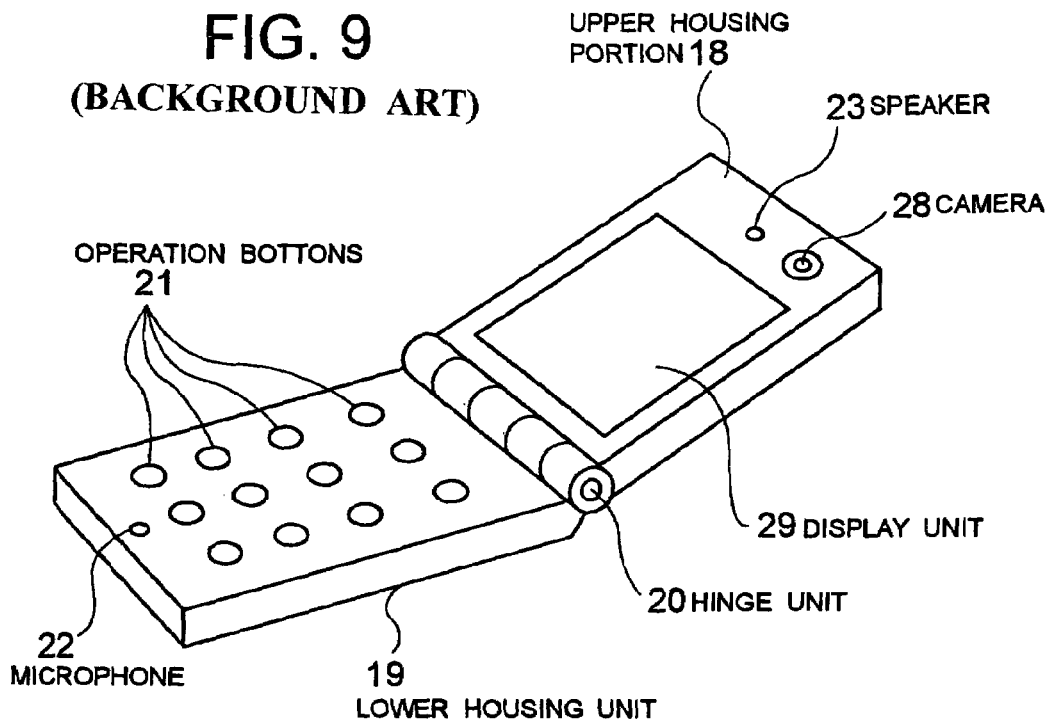
FIG. 9 is an oblique view of a conventional folding mobile phone.
Figure 10:
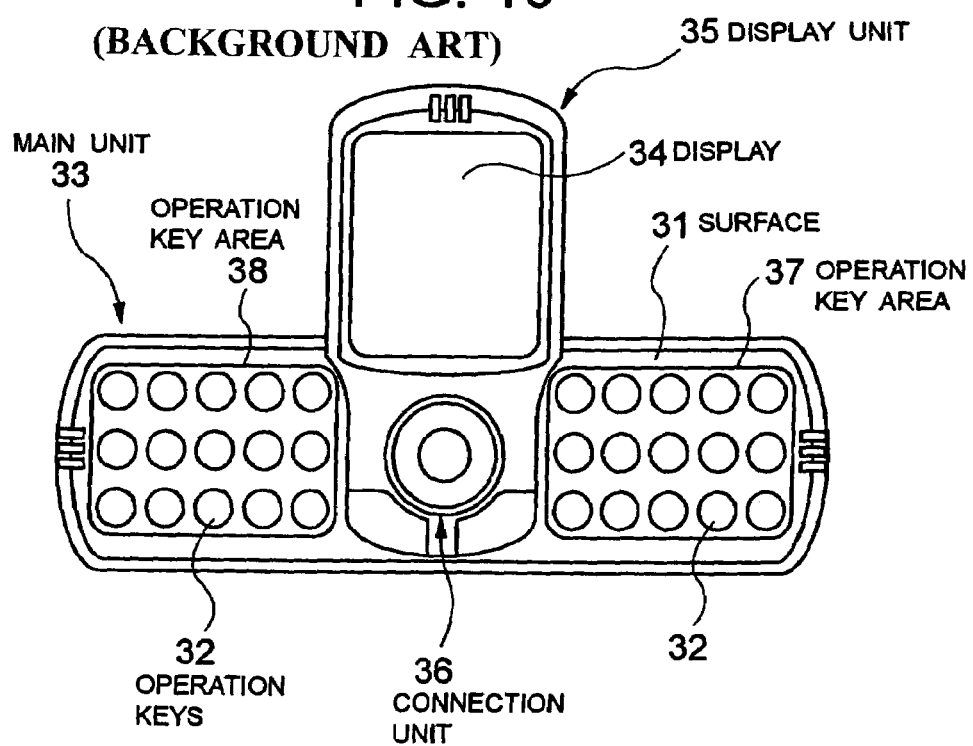
FIG. 10 shows an example of a conventional mobile information terminal.
Figure 11:
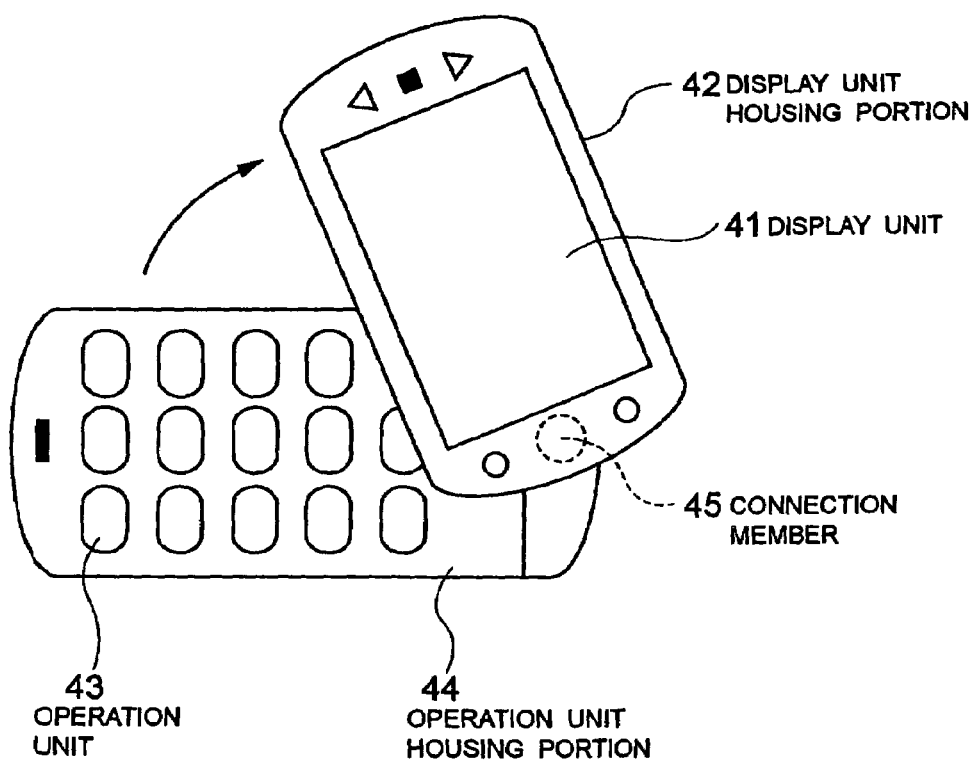
FIG. 11 shows another example of a conventional mobile information terminal.

A third embodiment of the present invention is described below. FIG. 7 is a side view of a mobile phone according to the third embodiment of the present invention. FIG. 8 is a sectional view of the mobile phone shown in FIG. 7. A main device unit 27, a second device unit 26, and a third device unit 25 respectively correspond to the first device unit 10, the second device unit 9, and the third device unit 8. FIG. 7 is a side view of the mobile phone in the mode in which the second device unit 26 and the third device unit 25 are expanded. FIG. 8 is a sectional view of the mobile phone in the mode in which the second device unit 26 and the third device unit 25 are stored on the back of the main device unit 27.

As shown in FIG. 8, each of the second device unit 26 and the third device unit 25 is designed to gradually taper in thickness from the center to the end of the main device unit 27 in the storage mode. Therefore, as shown in FIG. 7, the surface of the display of the main device unit 27 is held with a slant with respect to the horizontal surface 24 in the expanded mode. The main device unit 27 does not require the design (refer to FIG. 2) of the connection unit 10-2 held at a predetermined angle with respect to the main unit 10-1 in the first embodiment of the present invention. Therefore, the front surface of the main device unit 27 can be freely designed.

As described above, according to the present invention, a mobile communications equipment can be small when it is not in use, and data can be input to the mobile communications equipment with both hands, thereby realizing the operation style of a small personal computer although it is a mobile phone in size.

What is claimed is:

1. A mobile communications equipment, comprising:
   a first device unit having a display device thereon for displaying information; and
   second and third device units, each having various operation buttons thereon, and each having a first end with a first thickness and being gradually thinned from said first end to a second end, wherein:
   said first device unit further has thereon a single connection device for connecting said second and third device units to said first device unit at a single point, while permitting said second and third device units to be rotated, relative to said first device unit, about the single point, between a closed position and an open position,
   when said second and third device units are in the closed position, said second device unit first end is adjacent said third device unit first end, and
   when said second and third device units are in the open position and are positioned on a horizontal surface, said second and third device units extend in opposite directions from said first device unit with said first ends of said second and third device units substantially aligned, and said first device unit is held at a predetermined angle greater than 0° with respect to the horizontal surface.

2. The mobile communications equipment according to claim 1, wherein:
   in the closed position, said second and third device units are retracted to the back of said first device unit.

3. The mobile communications equipment according to claim 2, wherein:
   said connection device comprises an operation button, and a mechanical device responsive to actuation of said operation button for automatically rotating said second and third device units in predetermined directions, to rotate said second and third device units between the closed position and the open position.

4. The mobile communications equipment according to claim 2, further comprising:
   a camera device on the back of said main unit, said camera unit being concealed when said second device unit or said third device unit is in the closed position.

5. The mobile communications equipment according to claim 2, wherein:
   each of said second and third device units can be independently extended and retracted.

6. The mobile communications equipment according to claim 5, wherein said connection device further comprises:
   a motor for automatically extending and retracting said second and third device units.

7. The mobile communications equipment according to claim 1, wherein:
   said connection device extends at a predetermined angle from said display device.

8. A mobile communications equipment, comprising:
   a first device unit having a display device thereon;
   a second device unit having at least one operation key thereon;
   a third device unit having at least one operation key thereon; and
   a connection unit for connecting each of said second and third device units to said first device unit at a single connection point, while permitting rotation of said second and third device units, about the single connection point, relative to said first device unit, between a closed position in which said first and second device units are behind said first device unit, and an open position in which said second and third device units extend in opposite directions from said first device unit, wherein:
   when said second and third device units are in the closed position, a first end of said second device unit is adjacent a first end of said third device unit, and
   when said second and third device units are in the open position and are positioned on a horizontal surface, said second and third device units extend in opposite directions from said first device unit with said first ends of said second and third device units substantially aligned, and said first device unit is held at a predetermined angle greater than 0° with respect to the horizontal surface.

9. The mobile communications equipment according to claim 8, wherein said connection unit comprises an operation device, and a mechanical device responsive to actuation of said operation device for automatically rotating said second and third device units between the closed position and the open position.

10. The mobile communications equipment according to claim 9, wherein said mechanical device comprises a motor.

11. The mobile communications equipment according to claim 8, further comprising a camera device on at least one of said first, second, and third device units.

* * * * *